3,364,064
METHOD OF IMPROVING THE SOLDERABILITY OF A NICKEL SURFACE

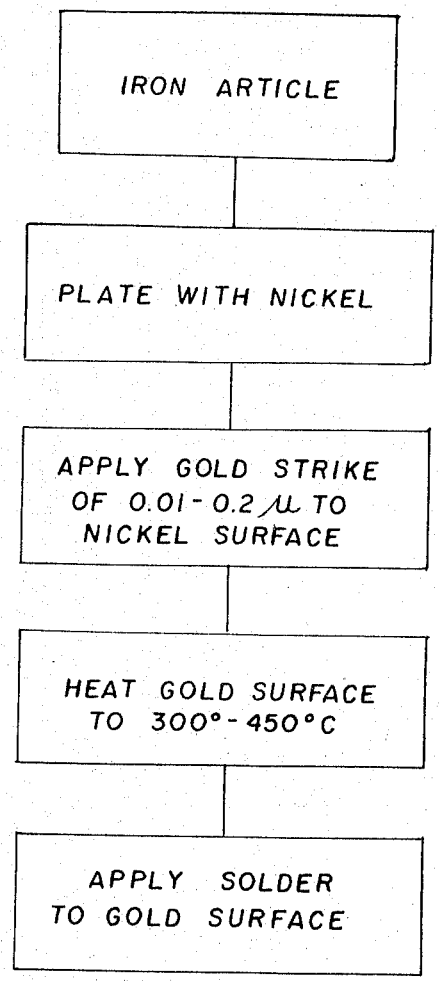

Matheus Adrianus Theresias Wijburg, Nijmegen, Netherlands, assignor to North American Philips Company, Inc., New York, N.Y., a corporation of Delaware
Filed July 30, 1963, Ser. No. 298,548
Claims priority, application Netherlands, Aug. 8, 1962, 281,894
2 Claims. (Cl. 117—131)

The invention in this case relates to a method of soft-soldering on a surface consisting mainly of nickel with a soldering metal such as Pb, Sn, tin alloys, In and indium alloys.

In a known method of improving the solderability of a nickel or nickel alloy surface the surface is coated with a gold strike of 1 to 2.5 $\mu$ in thickness before the solder is applied. However, this method presents the difficulties of requiring the use of large amounts of soldering metals and of a flux because of a low degree flow of the soldering metal on the gold surface.

For many purposes including the soldering of a semi-conductor device to a metal envelope such as a nickel plated fernico or nickel plated iron it is essential that no flux be employed and that the soldering layer be as thin as possible as it is necessary that the soldering layer have a low thermal transition resistance and a low electric transition resistance.

A principal object of my invention is to provide a new and improved method of soldering on nickel surfaces in which a low-melting point soldering metal has a significantly increased degree of flow and in which the use of fluxes is avoided.

This and other objects of my invention will be apparent from the description that follows.

According to my invention I have found that the rate of flow of a low-melting-point solder on a nickel surface can be increased by applying a gold strike of a thickness of 0.01 to 0.2 $\mu$ and then heating the nickel surface to a temperature between 300° C. and 450° C.

Examples of low-melting-point soldering metals that may be employed are Pb, Sn, In, alloys of tin, alloys of indium and gallium and alloys of indium and aluminum. Heating within the temperature range indicated above is an essential requirement for obtaining the desired result. Thus when the heating is below 300° C., the gold diffuses into the nickel layer to an inadequate extent, and the resultant solderability is not much better than that of a gold surface. If heating is carried out at a temperature higher than 450° C. for example about 500° C., the gold diffuses to an excessive extent into the nickel, so that the solderability of the surface is also reduced.

The gold layer may be applied to the nickel surface in many ways, for example by electro-deposition or by means of an electroless deposition bath without the use of an external current source. With a view to the uniformity of the gold layer, particularly if the soldering operation is to be carried out on small-size objects and with a view to the simplicity of the operation, the electroless method is preferred. These electroless deposition baths are known per se; for example such a bath may contain potassium-gold cyanide and tartaric acid and has a pH value of about 6.

In the method according to the invention no flux is required for soldering. Moreover, this method is extremely suitable for pressureless soldering.

Another advantage of the method of my invention is that it provides a protection against corrosion. This protection is materially better than that provided by anti-corrosion layers commonly used. Thus it is known to provide for this purpose a surface layer of metal less noble than the substratum metal. When the surface is damaged a short-circuited galvanic element is formed in a moist atmosphere, so that the basic metal is cathodically protected at the expense of the less noble layer, which is dissolved. However, if the less noble layer is dissolved to an excessive extent this protection is soon lost.

The layer of gold metal applied by the method according to the invention provides a barrier of a noble metal between the non-noble soldering metals, for example tin, and the basic metal, for example nickel, nickel-plated iron or nickel-plated fernico. As long as this layer of noble metal is not excessively damaged, this structure provides, when the non-noble outer layer is damaged, a much longer protection than the known structure described above.

A transistor envelope for use in a semi-conductor device for example is nickel-plated as a whole and provided with a gold strike, then heated according to the method of my invention, and for example, tin-plated. The latter operation may be carried out by electrodeposition. The resultant envelope obtained is excellently solderable, and well protected from corrosion.

As a test for the solderability the diameter of flow of a given, weighed portion of tin solder was employed. Nickel strips were coated with a gold layer of about 0.1 $\mu$. One plate was not heated and the other strips were heated for 30 minutes at temperatures of 100, 200, 250, 300, 350, 400, 450 and 500° C. Between 300° C. and 400° C. the diameter of flow of the tin was about three times that on the non-heated gold-plated strip. With strips heated below 300° C., this diameter of flow was scarcely larger and above 450° C. the diameter of flow was further reduced accordingly as below that of a non-heated gold-plated strip, the diameter of flow decreasing as the temperature increases above 450° C.

The process flow sheet set forth in the drawing shows one preferred embodiment of applicant's invention.

My invention will now be more fully explained with reference to the following examples:

Example 1

A number of iron mounting bottoms of semi-conductor elements having a diameter of 8 mm., and two glass-insulated through-connections and a supply wire welded to the bottom were provided, prior to melting, by electrodeposition with a nickel layer of a thickness of 5 $\mu$. For this purpose use was made of a Watt's nickel-plating bath heated at 60° C., the composition of which per litre was:

20 gms. of $NiCl_2.6H_2O$,
200 gms. of $NiSO_4.7H_2O$ and
25 gms. of $H_3BO_3$.

Then the mounting bottoms were coated with 0.1 $\mu$ gold by immersing them in an aqueous bath containing potassium-gold cyanide and tartaric acid and having a pH value of about 6.

The mounting bottoms were then heated at a temperature of 350° C. for 30 minutes. After cooling, a foil of a soldering metal of the composition: 70% of Sn and 30% of Pb, was placed on the side of the mounting bottom where the semi-conductor element would be provided. This foil was covered with a nickel strip to which a semi-conductor crystal consisting of a germanium crystal pellet soldered to a nickel strip by means of an indium-gallium alloy was secured. To melt the foil, the assembly was heated for a few seconds in a hot stream of a mixed gas, consisting of nitrogen and 5% by volume of hydrogen and having a temperature of 300° C. The foil flowed out immediately and provided a uniform coating of the surface of the mounting bottom. Then the assembly was cooled to room temperature in a cold air stream. An excellent adhesion of the crystal to the mounting bottom was obtained.

*Example 2*

A copper mounting bottom for very high power diodes, said bottom having a circular groove, was coated with a 1 μ nickel layer by means of the bath described in the preceding example by means of an electroless dispersion bath. It was then coated with a 0.1 μ gold strike and then it was heated at a temperature of 350° C. for 30 minutes. A cylindrical cap, closed at one end and having its lower side fitting amply in the circular groove of the mounting bottom, was nickel-plated, gold-plated and heated in the same manner. A foil of lead-tin alloy was placed on the mounting bottom and the crystal was arranged thereon. The cap was then arranged with its bottom side in the groove and a few pellets of lead-tin solder were placed near the groove at the cap, after which the assembly was heated at a temperature of about 350° C. The solder flowed between the groove and the edge of the cap and after cooling there had been formed an excellent adhesion. Moreover, the appearance of the soldering seam was particularly fine. At the same time the crystal was intimately secured to the mounting bottom.

*Example 3*

With the aid of a nickel-plating bath as described in Example 1 a nickel layer of 1 μ in thickness was applied to a copper bottom for a semi-conductor device. With the aid of an electroless deposition bath a gold strike of 0.1 μ in thickness was applied to the bottom and the assembly was heated at 350° C. for 30 minutes. The semi-conductor device was formed by a germanium crystal pellet, into which one indium pellet was partly diffused on either side by heating. On the collector side the indium pellet had been ground to flatness. The latter side was placed on the gold-plated surface and the assembly was heated at a temperature of 160° C. for a few minutes in an atmosphere of nitrogen and 5% by volume of hydrogen. A thin surface of the indium flowed out over the gold-plated bottom surface and thus provided an excellent adhesion of the semi-conductor crystal to the bottom.

While I have described my invention in connection with specific embodiments and applications, other modifications thereof will be readily apparent to those skilled in this art without departing from the spirit and scope of the invention as defined in the appended claims.

What I claim is:

1. The improvement in the method of soft soldering on a surface consisting mainly of nickel with a soldering metal which improvement comprises applying a gold strike of a thickness of 0.01 to 0.2 μ to the nickel surface and then heating said surface to a temperature between 300° C. and 450° C. prior to the application of the soldering metal.

2. The improvement in the method of soft soldering on a surface consisting mainly of nickel with a soldering metal selected from the group consisting of Pb, Sn, In, alloys of Sn and alloys of In, which improvement comprises applying a gold strike of a thickness of 0.01 to 0.2 μ to the nickel surface and then heating said surface to a temperature between 300° C. and 450° C. prior to the application of the soldering metal.

References Cited

UNITED STATES PATENTS

| | | | |
|---|---|---|---|
| 2,429,222 | 10/1947 | Ehrhardt et al. | 29—199 X |
| 2,969,295 | 1/1961 | Crishal et al. | 117—130 |

FOREIGN PATENTS

| | | |
|---|---|---|
| 872,785 | 7/1961 | Great Britain. |

ALFRED L. LEAVITT, *Primary Examiner.*

MURRAY KATZ, *Examiner.*

J. R. BATTEN, JR., *Assistant Examiner.*